(12) United States Patent
Trainin et al.

(10) Patent No.: US 10,194,461 B2
(45) Date of Patent: *Jan. 29, 2019

(54) APPARATUS, SYSTEM AND METHOD OF DYNAMIC ALLOCATION USING A GRANT FRAME

(71) Applicant: INTEL CORPORATION, Santa Clara, CA (US)

(72) Inventors: Solomon B. Trainin, Haifa (IL); Carlos Cordeiro, Portland, OR (US); Assaf Kasher, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/713,669

(22) Filed: Sep. 24, 2017

(65) Prior Publication Data
US 2018/0110067 A1    Apr. 19, 2018

Related U.S. Application Data

(63) Continuation of application No. 14/670,436, filed on Mar. 27, 2015, now Pat. No. 9,775,170.
(Continued)

(51) Int. Cl.
*H04W 72/14* (2009.01)
*H04W 72/04* (2009.01)

(52) U.S. Cl.
CPC ........ *H04W 72/14* (2013.01); *H04W 72/0446* (2013.01)

(58) Field of Classification Search
CPC .................................................. H04W 72/14
See application file for complete search history.

(56) References Cited

U.S. PATENT DOCUMENTS 7,123,627 B2   10/2006   Kowalski
7,224,679 B2    5/2007   Solomon et al.
(Continued)

FOREIGN PATENT DOCUMENTS

KR    20110102847    9/2011
RU     2323525       4/2008
WO    2011060156    5/2011

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
(Continued)

*Primary Examiner* — Parth Patel
(74) *Attorney, Agent, or Firm* — Shichrur & Co.

(57) ABSTRACT

Some demonstrative embodiments include apparatuses, devices, systems and methods of dynamically scheduling a transmit opportunity. For example, a first wireless station may be configured to generate a grant frame including a duration field and a dynamic allocation information field, the dynamic allocation information field including an allocation duration subfield, the allocation duration subfield being set to a value within a predefined range of values, when the grant frame is to grant to a second wireless station a period after a Transmit Opportunity (TxOP), the allocation duration subfield being set to a predefined value which is not within the predefined range of values, when the grant frame is to grant to the second wireless station a period within the TxOP; and transmit the grant frame during the TxOP.

30 Claims, 7 Drawing Sheets

Related U.S. Application Data

(60) Provisional application No. 62/087,313, filed on Dec. 4, 2014, provisional application No. 62/127,861, filed on Mar. 4, 2015.

(56) References Cited

U.S. PATENT DOCUMENTS

| | | | |
|---|---|---|---|
| 8,855,063 B2* | 10/2014 | Gong | H04L 1/1685 |
| | | | 370/329 |
| 8,953,634 B2* | 2/2015 | Trainin | H04W 72/0446 |
| | | | 370/235 |
| 9,450,711 B2 | 9/2016 | Sridhara et al. | |
| 9,693,349 B2* | 6/2017 | Trainin | H04W 72/0446 |
| 9,775,170 B2* | 9/2017 | Trainin | H04W 72/14 |
| 9,819,839 B2* | 11/2017 | Matsuo | H04N 5/06 |
| 9,820,254 B2* | 11/2017 | Mochizuki | H04W 60/04 |
| 2002/0120740 A1 | 8/2002 | Ho et al. | |
| 2003/0133460 A1 | 7/2003 | Lee et al. | |
| 2003/0214905 A1* | 11/2003 | Solomon | H04L 1/0017 |
| | | | 370/229 |
| 2004/0109688 A1 | 6/2004 | Kim et al. | |
| 2005/0063408 A1* | 3/2005 | Famolari | H04W 72/0446 |
| | | | 370/431 |
| 2005/0195776 A1 | 9/2005 | Xu | |
| 2006/0062181 A1 | 3/2006 | Chou | |
| 2006/0092871 A1 | 5/2006 | Nishibayashi et al. | |
| 2008/0002615 A1 | 1/2008 | Nakajima et al. | |
| 2009/0116462 A1 | 5/2009 | Powell et al. | |
| 2010/0080173 A1 | 1/2010 | Takagi | |
| 2010/0157910 A1 | 6/2010 | Nentwig et al. | |
| 2010/0176929 A1 | 7/2010 | Ozdemir et al. | |
| 2011/0110349 A1 | 5/2011 | Grandhi | |
| 2011/0142028 A1 | 6/2011 | Kasslin et al. | |
| 2011/0158159 A1 | 6/2011 | Gong et al. | |
| 2011/0286402 A1 | 11/2011 | Gong | |
| 2013/0003689 A1 | 1/2013 | Kwon et al. | |
| 2013/0163496 A1 | 6/2013 | Trainin et al. | |
| 2013/0252657 A1 | 9/2013 | Kafle | |
| 2014/0071873 A1 | 3/2014 | Wang et al. | |
| 2014/0078928 A1 | 3/2014 | Verma et al. | |
| 2014/0079016 A1 | 3/2014 | Dai et al. | |
| 2014/0105201 A1 | 4/2014 | Seok | |
| 2014/0119288 A1 | 5/2014 | Zhu et al. | |
| 2014/0206352 A1* | 7/2014 | Mochizuki | H04W 60/04 |
| | | | 455/435.1 |
| 2014/0294064 A1 | 10/2014 | Wang | |
| 2014/0294092 A1 | 10/2014 | Wang | |
| 2015/0249936 A1 | 9/2015 | Chen et al. | |
| 2015/0351123 A1 | 12/2015 | Trainin et al. | |
| 2015/0373694 A1 | 12/2015 | You et al. | |
| 2016/0021577 A1 | 1/2016 | Du et al. | |
| 2016/0037553 A1 | 2/2016 | Attar et al. | |
| 2016/0156673 A1 | 6/2016 | Emmanuel et al. | |
| 2016/0165637 A1 | 6/2016 | Kim et al. | |
| 2016/0191409 A1 | 6/2016 | Li | |
| 2016/0249349 A1 | 8/2016 | Trainin et al. | |
| 2016/0255656 A1 | 9/2016 | Lou et al. | |

OTHER PUBLICATIONS

IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

International Search Report and Written Opinion for PCT/US2015/058935, dated Feb. 15, 2016, 11 pages.

Office Action for U.S. Appl. No. 14/670,436, dated Nov. 8, 2016, 32 pages.

International Preliminary Report on Patentability for PCT/US2015/058935, dated Jun. 15, 2017, 8 pages.

Notice of Allowance for U.S. Appl. No. 14/670,436, dated Apr. 20, 2017, 16 pages.

European Search Report for European Patent Application No. 15865941.7, dated Jun. 20, 2018, 8 pages.

Office Action for Russian Patent Application No. 2017115799, dated May 30, 2018, 10 pages (Including 3 pages of English translation).

Office Action for Russian Patent Application No. 2018104807 dated Oct. 3, 2018, 7 pages (Including 2 pages of English translation).

* cited by examiner

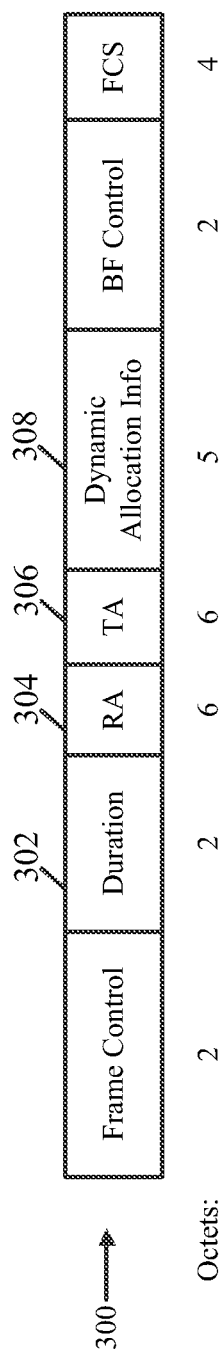
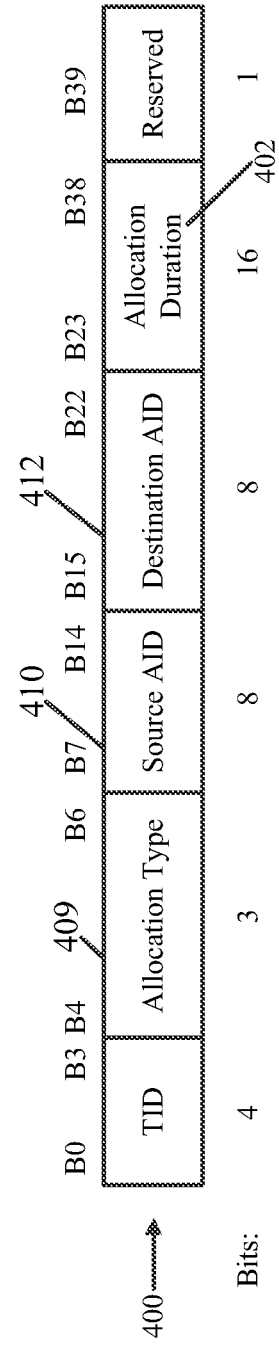
Fig. 3
Fig. 4

APPARATUS, SYSTEM AND METHOD OF DYNAMIC ALLOCATION USING A GRANT FRAME

CROSS REFERENCE

This Application claims the benefit of and priority from U.S. Provisional Patent Application No. 62/087,313 entitled "Apparatus, System and Method of Dynamically Scheduling a Transmit Opportunity", filed Dec. 4, 2014, and U.S. Provisional Patent Application No. 62/127,861 entitled "Apparatus, System and Method of Dynamic Allocation Using a Grant Frame", filed Mar. 4, 2015, the entire disclosures of both of which are incorporated herein by reference.

TECHNICAL FIELD

Embodiments described herein generally relate to dynamic allocation using a grant frame.

BACKGROUND

A wireless communication network in a millimeter-wave band may provide high-speed data access for users of wireless communication devices.

A wireless communication station may communicate a grant frame. The grant frame may include a duration field and an Allocated duration, for example, according to *IEEE 802.11ad-2012* (*"IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band"*, 28 Dec. 2012).

However, the current definition of fields and subfields of the grant frame according to IEEE 802.11ad-2012 may not be applicable, efficient and/or sufficient, e.g., in some scenarios, implementations and/or use cases.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 3 is a schematic illustration of a grant frame, in accordance with some demonstrative embodiments.

FIG. 4 is a schematic illustration of a dynamic allocation information field, in accordance with some demonstrative embodiments.

DETAILED DESCRIPTION

Figure 1:
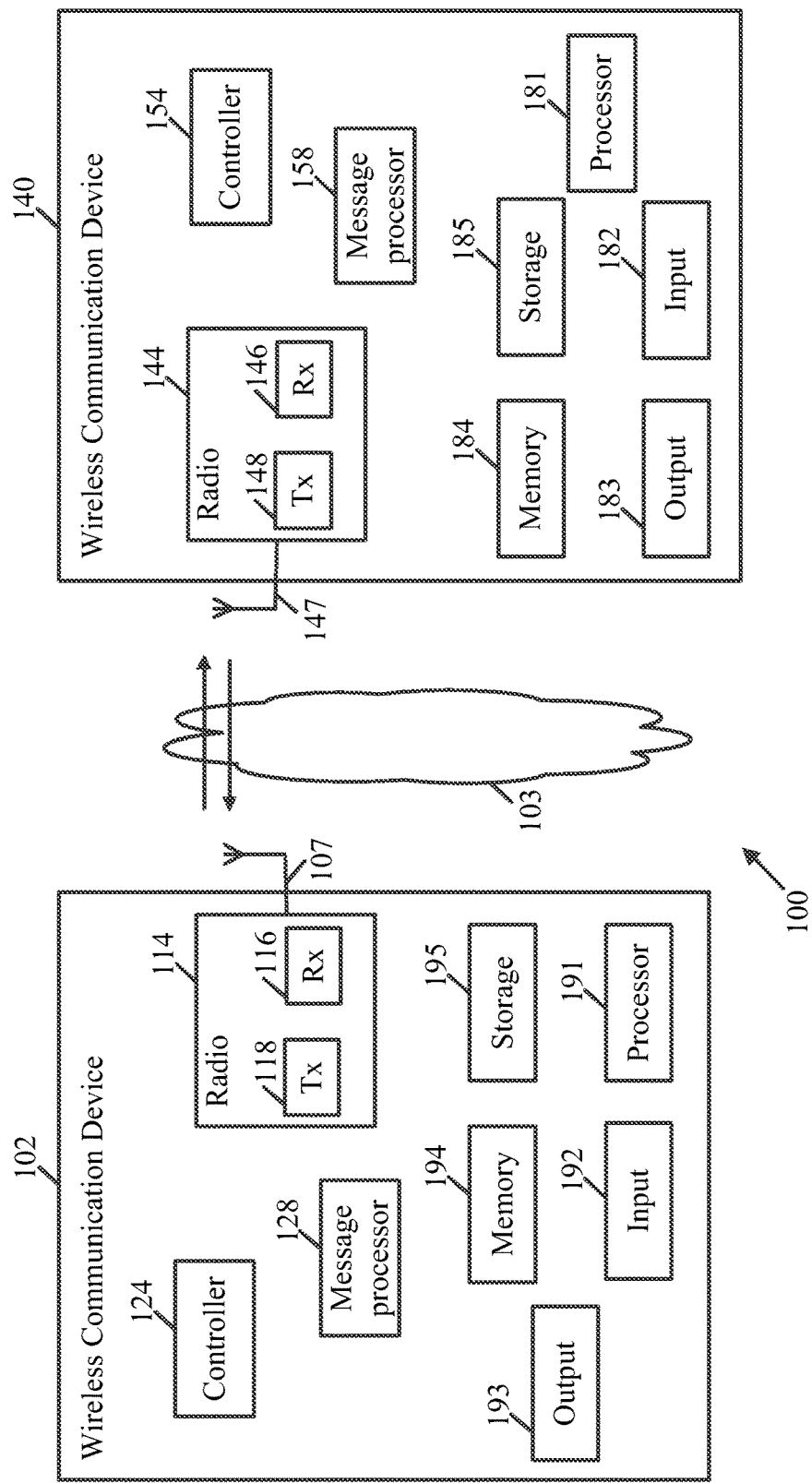
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, an Internet of Things (IoT) device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, April 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part* 11: *Wireless LAN Medium Access Control (MAC) and Physical Layer (PHY) Specifications*, Mar. 29, 2012; *IEEE*802.11*ac*-2013 (*"IEEE P*802.11*ac*-2013, *IEEE Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 4: *Enhancements for Very High Throughput for Operation in Bands below* 6 *GHz*", December, 2013); *IEEE* 802.11*ad* (*"IEEE P*802.11*ad*-2012, *IEEE Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 3: *Enhancements for Very High Throughput in the* 60 *GHz Band*", 28 Dec. 2012); *IEEE-802.11 REVmc* (*"IEEE* 802.11-*REVmc*™/*D*3.0, June 2014 *draft standard for Information technology—Telecommunications and information exchange between systems Local and metropolitan area networks Specific requirements*; *Part* 11: *Wireless LAN Medium Access Control (MAC) and Physical Layer (PHY) Specification*")) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, a frequency band according to the IEEE 802.11 specifications, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and a storage unit 195; and/or device 140 may include, for example, one or more of a processor 181, an input unit 182, an output unit 183, a memory unit 184, and a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a WLAN channel, a Wireless Fidelity (WiFi) channel, an IR channel, a Bluetooth (BT) channel, a Global Navigation Satellite System (GNSS) Channel, and the like.

In some demonstrative embodiments, WM 103 may include a directional channel. For example, WM 103 may include a millimeter-wave (mmWave) wireless communication channel.

In some demonstrative embodiments, WM 103 may include a DMG channel. In other embodiments, WM 103 may include any other additional or alternative directional channel.

In other embodiments, WM 103 may include any other type of channel over any other frequency band.

In some demonstrative embodiments, devices 102 and/or 140 may perform the functionality of one or more wireless stations, e.g., as described below.

In some demonstrative embodiments, devices 102 and/or 140 may perform the functionality of one or more DMG stations.

In other embodiments, devices 102 and/or 140 may perform the functionality of any other wireless device and/or station, e.g., a WLAN STA, a WiFi STA, and the like.

In some demonstrative embodiments, devices 102 and/or 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include circuitry, logic, modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be steered to a plurality of beam directions.

In some demonstrative embodiments, device 102 may include a controller 124, and/or device 140 may include a controller 154. Controllers 124 and/or 154 may be configured to perform one or more communications, operations and/or procedures between devices 102 and 140, e.g., as described below.

In some demonstrative embodiments, controllers 124 and/or 154 may include circuitry and/or logic, e.g., one or more processors including circuitry and/or logic, memory circuitry and/or logic, a processing system including circuitry and/or logic, Media-Access Control (MAC) circuitry and/or logic, Physical Layer (PHY) circuitry and/or logic, and/or any other circuitry and/or logic, configured to perform the functionality of controllers 124 and/or 154. Additionally or alternatively, one or more functionalities of controllers 124 and/or 154 may be implemented by logic, which may be executed by a machine and/or one or more processors, e.g., as described below.

In one example, controller 124 may include one or more processors including circuitry and/or logic to cause a wireless device, e.g., device 102, and/or a wireless station, e.g., a wireless STA implemented by device 102, to perform one or more operations, communications and/or functionalities, e.g., as described herein.

In one example, controller 154 may include one or more processors including circuitry and/or logic to cause a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, message processor 128 may be configured to process transmission of one or more messages transmitted by device 102, message processor 128 may be configured to process reception of one or more messages received by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, message processor 158 may be configured to process transmission of one or more messages transmitted by device 140, message processor 158 may be configured to process reception of one or more messages received by device 140, and/or message processor 158 may be configured to access and/or to process one or more messages received by device 140, e.g., as described below.

In some demonstrative embodiments, message processors 128 and/or 158 may include circuitry and/or logic, e.g., processor circuitry and/or logic, memory circuitry and/or logic, a processing system including circuitry and/or logic, Media-Access Control (MAC) circuitry and/or logic, Physical Layer (PHY) circuitry and/or logic, and/or any other circuitry and/or logic configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 104.

In some demonstrative embodiments, devices 102 and/or 140 may be configured to perform the functionality of an access point (AP), e.g., a DMG AP, and/or a personal basic service set (PBSS) control point (PCP), e.g., a DMG PCP, for example, an AP/PCP STA, e.g., a DMG AP/PCP DMG STA.

In some demonstrative embodiments, devices 102 and/or 140 may be configured to perform the functionality of a non-AP STA, e.g., a DMG non-AP STA, and/or a non-PCP STA, e.g., a DMG non-PCP STA, for example, a non-AP/PCP STA, e.g., a DMG non-AP/PCP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, devices 102 and 140 may be configured to perform operations of dynamic scheduling, e.g., as described below.

In some demonstrative embodiments, dynamic scheduling of an allocated time may be provided to a station, for example, using a Grant frame, e.g., as described below.

In some demonstrative embodiments, controller 124 may cause radio 114 to generate, process and/or transmit a grant frame, e.g., to device 140, for example, to dynamically allocate a time period, e.g., to device 140, e.g., as described below.

In some demonstrative embodiments, radio 144 may receive the grant frame, and controller 154 may process the grant frame, and may perform one or more operations according to the contents of the grant frame. For example, controller 154 may control communications by device 140 according to the allocated time period allocated by the grant frame. In one example, controller 154 may cause device 140 to communicate during the allocated time period, e.g., as described below.

In some demonstrative embodiments, the Grant frame may be generated and/or transmitted by an AP, a PCP, an AP/PCP STA, a non-AP STA, a non-PCP STA, and/or a non-AP/PCP STA.

In some demonstrative embodiments, the Grant frame may be addressed to, received by, and/or processed by, an AP, a PCP, an AP/PCP STA, a non-AP STA, a non-PCP STA, and/or a non-AP/PCP STA.

In some demonstrative embodiments, the Grant frame may include a Duration field and an Allocated duration field, e.g., as described below with reference to FIG. 3 and/or FIG. 4.

In some demonstrative embodiments, the duration field may, for example, indicate a duration, which may, for example, cover a time, e.g., in microseconds.

In other embodiments, the duration field may include any other duration and/or may represent any other time units.

In some demonstrative embodiments, the allocation duration field may indicate an allocated time, e.g., as described below.

In some demonstrative embodiments, in some scenarios, use cases and/or implementations, a grant frame may include an Allocation duration field set to indicate an allocated time size, and the Duration field of the grant frame may be set to indicate a point in time, where the allocated time size indicated in the Allocation duration field may start, e.g., a described below.

Figure 2:
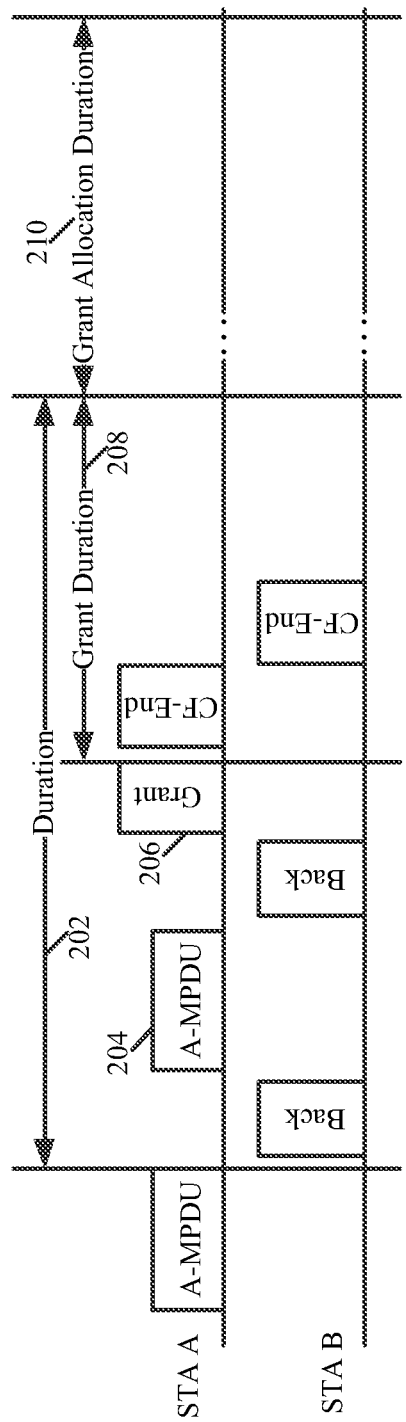
FIG. 2 is a schematic illustration of an allocation beginning at an end of a duration indicated by a duration field of a grant frame, in accordance with some demonstrative embodiments.

FIG. 2 is a schematic illustration of an allocation duration beginning at an end of a duration indicated by a duration field of a grant frame, in accordance with some demonstrative embodiments.

As shown in FIG. 2, a first device (STA A) may have a duration ("duration") 202, during which the STA A may transmit a transmission, e.g., an Aggregate Media access control protocol data unit (A-MPDU) 204, to a second device (STA B).

As shown in FIG. 2, the STA A may transmit a grant frame 206, e.g., to the STA B.

As shown in FIG. 2, the STA A and/or STA B may set a grant allocation duration 210 to begin at an end of a time period 208 ("grant duration") indicated by a duration field of the grant frame 206.

As shown in FIG. 2, the Grant duration 208 may be set to end at an end of the duration 202. Accordingly, the allocation duration 210 may begin at the end of the duration 202.

In some demonstrative embodiments, defining the duration field of a grant frame to indicate a time at which an allocated time size indicated in an Allocation duration field of the grant frame may start my not be suitable for some use cases, scenarios, and/or implementations, e.g., as described below.

Referring back to FIG. 1, devices 102 and/or 140 may be configured to use a grant frame to perform dynamic allocation within a Transmit Opportunity ("TxOP" or "TXOP") or a Service Period (SP), e.g., as described below.

In some demonstrative embodiments, devices 102 and/or 140 may be configured to communicate a grant frame during a Contention based Access Period (CBAP).

In some demonstrative embodiments, the grant frame may be transmitted during a TxOP. For example, the grant frame may be transmitted from a TxOP holder station to a TxOP responder station. In one example, device 102 may perform the functionality of the TxOP holder station, and/or device 140 may perform the functionality of the TxOP responder station.

In some demonstrative embodiments, devices 102 and/or 140 may be configured to use the grant frame, for example, during a CBAP, for example, to grant an allocation beyond a current TxOP, e.g., as described below.

In some demonstrative embodiments, devices 102 and/or 140 may be configured to use the grant frame, for example, during a CBAP, for example, to grant an allocation within a current TxOP, e.g., as described below.

In some demonstrative embodiments, devices 102 and/or 140 may be configured to communicate the grant frame during a Service Period (SP). For example, the grant frame may be transmitted from a Source STA of the SP to a destination station of the SP. In one example, device 102 may perform the functionality of the source STA, and/or device 140 may perform the functionality of the destination station.

In some demonstrative embodiments, devices 102 and/or 140 may be configured to use the grant frame, for example, during a SP, for example, to grant an allocation within a current SP, e.g., as described below.

In some demonstrative embodiments, devices 102 and/or 140 may be configured to perform dynamic allocation within a TxOP or a SP, e.g., as described below.

In some demonstrative embodiments, devices 102 and 140 may be configured to reschedule, e.g., relinquish, a remainder of a TXOP or a SP, for example, using a grant frame, e.g., as described below.

In one example, device 102 may be the holder of a TXOP. Controller 124 may be configured to reschedule, e.g., relinquish, a remainder of the TXOP, for example, to another device, e.g., to device 140, for example, if device 102 has no additional data to be transmitted during the TxOP, or for any other reason.

In one example, controller 124 may cause radio 144 to transmit, e.g., to device 140, a grant frame configured to reschedule, e.g., relinquish, at least part of the TxOP, e.g., a remainder of the TxOP, to another device, e.g., to device 140, as described below.

In one example, device 102 may be the source STA of a SP. Controller 124 may be configured to reschedule, e.g., relinquish, a remainder of the SP, for example, to another device, e.g., to device 140, for example, if device 102 has no additional data to be transmitted during the SP, or for any other reason.

In one example, controller 124 may cause radio 114 to transmit, e.g., to device 140, a grant frame configured to reschedule, e.g., relinquish, at least part of the SP, e.g., a remainder of the SP, to another device, e.g., to device 140, as described below.

In some demonstrative embodiments, when rescheduling at least part of the TXOP or the SP, the grant frame may be configured to allocate time within the TxOP or SP, e.g., while not allocating time in addition to the existent TxOP or SP.

In some demonstrative embodiments, the duration field of the grant frame may be set to point to an end of the TxOP or SP.

In some demonstrative embodiments, defining the allocated time of the Allocation Duration field of the grant frame to begin at the end of the time period indicated by the duration field of the grant frame, e.g., as described above, may not enable device 102 to communicate to device 140 that the remainder of the TxOP or SP is to be rescheduled, e.g., if the duration field points to end of the TxOP or SP. Current versions of protocols and/or standards, for example, IEEE 802.11ad-2012 and/or IEEE 802.11REVmc, do not provide a solution for this situation.

In some demonstrative embodiments, setting the duration field to cover the dynamically allocated time, e.g., and not the start of the dynamic allocation, may not provide an efficient solution in some scenarios, use cases and/or implementations, for example, when the allocated time may start at an end of the time presented in the duration field.

In some demonstrative embodiments, devices 102 and 140 may be configured to use a predefined value, e.g., a reserved value, in the Allocation duration field of the grant frame, for example, instead of a value indicating a size of an allocated duration, e.g., as described below.

In some demonstrative embodiments, when using the grant frame during a TXOP, the predefined value, e.g., the reserved value, may be configured to indicate that a remainder of the TxOP is to be rescheduled, for example, from a transmitter of the grant frame to a receiver of the grant frame, for example, if the grant frame is transmitted during the TXOP.

In one example, controller 124 may address the grant frame to device 140, and may set the Allocation duration field of the grant frame to the predefined value, for example, to indicate that a remainder of the TxOP is to be rescheduled, e.g., relinquished, to device 140.

In some demonstrative embodiments, when the allocation is out of the TxOP, the allocation may start at the sum of the value in the Duration field ("duration value") and the value in the Allocation Duration field ("allocation duration value"), e.g., as described below.

In one example, controller 124 may address the grant frame to device 140, and may set the Allocation duration field of the grant frame to a value other than the predefined value, for example, to indicate an actual size, e.g., in microseconds, of a period to be allocated following the duration indicated by the duration field of the grant frame, e.g., as described below.

In some demonstrative embodiments, when using the grant frame during a SP, the predefined value, e.g., the reserved value, may be configured to indicate that a remainder of the SP is to be rescheduled, for example, from a transmitter of the grant frame to a receiver of the grant frame, for example, if the grant frame is transmitted during the SP.

In one example, controller 124 may address the grant frame to device 140, and may set the Allocation duration field of the grant frame to the predefined value, for example, to indicate that a remainder of the SP is to be rescheduled, e.g., relinquished, to device 140.

Reference is made to FIG. 3, which schematically illustrates a grant frame 300, in accordance with some demonstrative embodiments. For example, the grant frame 300 may be transmitted from a first device, e.g., device 102 (FIG. 1), to a second device, e.g., device 140 (FIG. 1).

As shown in FIG. 3, grant frame 300 may include a duration field 302 (also referred to as "Duration/ID field"), a receive address (RA) field 304, a transmit address (TA) field, 306 and a dynamic allocation information (info) field 308.

In some demonstrative embodiments, the RA field 304 may include, for example, an address, e.g., a MAC address, of a station to receive the grant frame 300, e.g., device 140 (FIG. 1), and the TA field may include, for example, an address, e.g., a MAC address, of a station transmitting the grant frame 300, e.g., device 102 (FIG. 1).

Reference is also made to FIG. 4 is a schematic illustration of a dynamic allocation information field 400, in accordance with some demonstrative embodiments. For example, dynamic allocation information field 400 may perform the functionality of the dynamic allocation info field 308 (FIG. 3).

In some demonstrative embodiments, dynamic allocation field 400 may include an Allocation type field 409, which may be set, for example, to define a channel access mechanism during an allocation to be granted by grant frame 300 (FIG. 3). In one example, Allocation type field 409 may be set to a first value, e.g., to indicate a SP, or to a second value, e.g., to indicate a CBAP.

In some demonstrative embodiments, dynamic allocation information field 400 may include a Source Association Identifier (AID) field 410, which may be set to identify a STA that is to be a source of an allocation, e.g., to be granted by grant frame 300 (FIG. 3).

In some demonstrative embodiments, dynamic allocation information field 400 may include a Destination AID field 412, which may be set to identify a STA that is to be a destination of the allocation, e.g., to be granted by grant frame 300 (FIG. 3).

In some demonstrative embodiments, dynamic allocation information field 400 may include an Allocation duration subfield 402, e.g., as described below.

In some demonstrative embodiments, when an Dynamic Allocation Info subfield, e.g., Dynamic allocation subfield 400, is transmitted within a Grant frame, e.g., grant frame 300 (FIG. 3), the Allocation Duration subfield, e.g., Allocation Duration subfield 402, may be set to contain, for example, a granted duration, for example, of an allocated time, e.g., of a Service Period (SP) allocation or Contention Based Access Period (CBAP) allocation, e.g., in microseconds.

In some demonstrative embodiments, Allocation Duration subfield 402 may be configured to include a duration value, e.g., in microseconds, which may be selected, for example, from a predefined a range of values ("possible values").

In one example, possible values of Allocation Duration subfield 402 may range, for example, from 0 to 32767, e.g., for a CBAP allocation. In other embodiments, the value of Allocation Duration subfield 402 may be set within any other predefined range of values.

In some demonstrative embodiments, the Allocation Duration field 402 for a CBAP allocation may be limited by a limit of the TxOP, e.g., during which the grant frame is transmitted.

In some demonstrative embodiments, Allocation Duration subfield 402 may be configured to include a predefined value, which may not be in the range of possible values, for example, to indicate that the grant frame 300 (FIG. 3) is to be used to reschedule, e.g., relinquish, a TxOP or a SP, e.g., as described below.

In some demonstrative embodiments, if a value, for example, which is not in the range of possible values, e.g., a value of 32768, is set in the Allocation Duration subfield 402 transmitted within a Grant frame 300 (FIG. 3), then a dynamical allocation may start after, for example, a Short Inter Frame Space (SIFS) after, the sent Grant frame 300 (FIG. 3), or a SIFS after a sent Grant Acknowledge (Ack) frame, e.g., if a Grant Ack Supported field is equal to 1 in a responder's DMG Capabilities element.

In some demonstrative embodiments, if the value of 32768 in the Allocation Duration subfield 402 is transmitted within the Grant frame 300 then, for example, the dynamical allocation may continue, for example, until expiration of the duration presented in the Duration/ID field of the Grant frame, e.g., duration field 302 (FIG. 3) of grant frame 300 (FIG. 3).

In some demonstrative embodiments, a value of "0" in the Allocation Duration subfield 402 transmitted within a Grant frame 300 (FIG. 3) may mean, for example, that the STA can transmit one PPDU followed by any relevant acknowledgment plus one Request to Send (RTS)/DMG Clear to Send (CTS) handshake.

In some demonstrative embodiments, the Allocation Duration subfield 402 of a grant frame, e.g., grant frame 300 (FIG. 3), transmitted in TxOP or a SP, may be set to the predefined value, e.g., the value of 32768, for example, to indicate that the grant frame is to be used to relinquish a remainder of the TxOP or SP, e.g., as described below.

Figure 5:
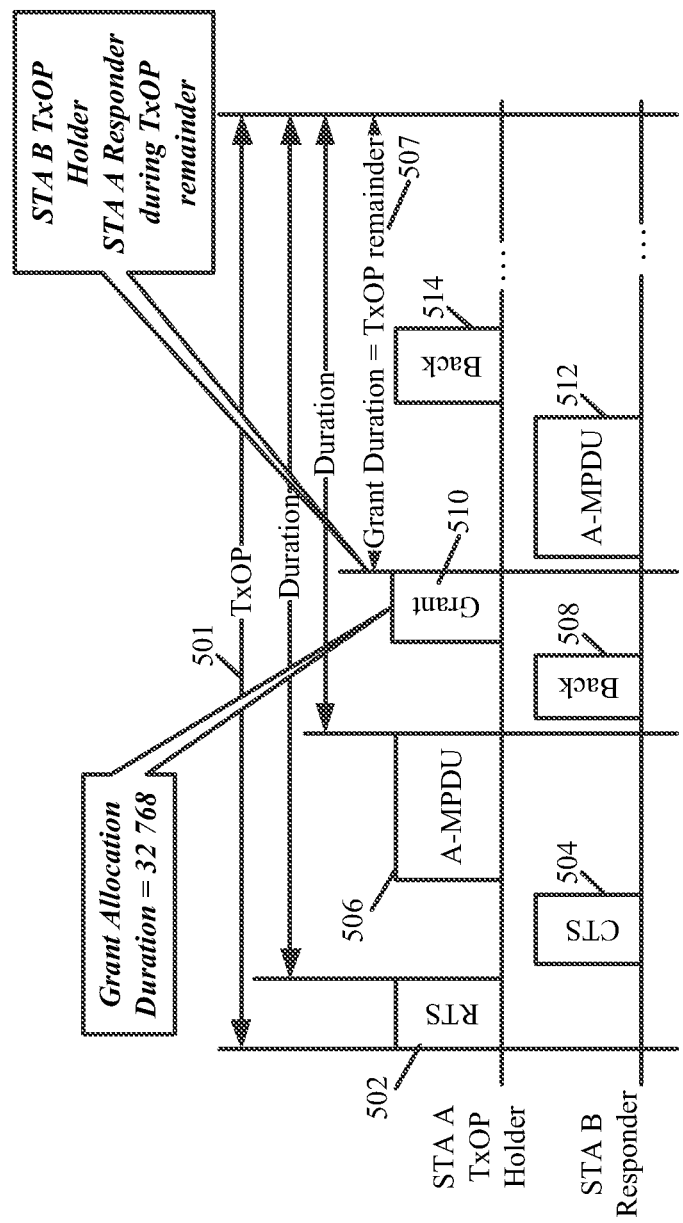
FIG. 5 is a schematic illustration of an allocation within a Transmit Opportunity (TxOP), in accordance with some demonstrative embodiments.

Reference is made to FIG. 5, which schematically illustrates a dynamic allocation of a Transmit Opportunity (TxOP), in accordance with some demonstrative embodiments.

Some demonstrative embodiments are described below with respect to operations and/or communications configured to relinquish a remainder of a TXOP, e.g., as described below with reference to FIG. 5. In other embodiments, one or more of the operations and/or communications may be implemented, for example, to relinquish a remainder of a SP, or any other period or allocation.

As shown in FIG. 5, a first device (STA A), e.g., device 102 (FIG. 1), may be a TxOP holder of a TxOP 501. For example, the STA A may transmit a Request to Send (RTS) frame 502, or any other transmission configured to obtain TxOP 501. The STA B may respond to the RTS 502 with a Clear to Send (CTS) frame 504, or any other frame.

In some demonstrative embodiments, the TxOP 501 may be within a CBAP.

As shown in FIG. 5, STA A may transmit a data frame, e.g., an A-MPDU 506, to STA B, and STA B may respond with a Block Acknowledge (BACK) 508.

As shown in FIG. 5, the STA A may transmit a grant frame 510, e.g., to the STA B.

In some demonstrative embodiments, controller 124 (FIG. 1) may set the predefined value, e.g., the value of 32768, in the Allocation Duration field, e.g., allocation duration field 402 (FIG. 4), of the grant frame 510. The predefined value may be configured, for example, to be outside the range of possible values, e.g., the range 0-32767, which may be used to indicate an allocated duration of a time period, e.g., as described above.

In some demonstrative embodiments, controller 124 (FIG. 1) may set the Allocation duration field 402 (FIG. 4) of Grant frame 510 to the predefined value of 32768, for example, to indicate that the remainder 507 of the TxOP 501, e.g., as indicated in the Duration field 302 (FIG. 3) of the Grant frame 510, is to be reallocated, e.g., relinquished, for example, from STA A to STA B, for example, such that the STA B may become the TXOP holder and the STA A may become the TXOP responder.

For example, as shown in FIG. 5, the STA B may be allowed to transmit a transmission, e.g., an A-MPDU 512, to STA A, and STA A may respond with a BACK 514.

Referring back to FIG. 1, in some demonstrative embodiments, device 102 may transmit a grant frame, e.g., grant frame 300 (FIG. 3), for example, during a CBAP.

In some demonstrative embodiments, the grant frame may include an Allocation duration field, e.g., Allocation duration field 402 (FIG. 4), which may be set to indicate a purpose of the grant frame transmission, e.g., as described below.

In some demonstrative embodiments, when a Dynamic Allocation Info subfield, e.g., the Dynamic Allocation Info subfield 308 (FIG. 3) of frame 300 (FIG. 3), is transmitted within a Grant frame of a CBAP, e.g., grant frame 300 (FIG. 3), the value of the Allocation Duration field, e.g., duration allocation field 402 (FIG. 4), may indicate a purpose of the Grant frame transmission.

In some demonstrative embodiments, two purposes may be possible for the Grant frame transmission, e.g., as follows:

a) Beyond Current TXOP:

in this case, the Allocation Duration field values range from 0 to 32 767. The value of the Allocation Duration field plus the Duration field of the Grant frame indicates the time offset from the PHY-TXEND.indication primitive of the Grant frame when the STA transmitting the Grant frame will attempt to initiate access for communication with the STA indicated by the RA field of the Grant frame.

b) Within Same TXOP:

in this case, the Allocation Duration subfield is set to 32 768.

In one example, device 102 may transmit grant frame 300 (FIG. 3) to grant an allocation after a current TxOP, e.g., as described above. According to this example, device 102 may set the grant frame 300 (FIG. 3) to include the Allocation Duration field 402 (FIG. 4) set to a value within a predefined range of values, e.g., within the range of the values between 0 and 32 767.

According to this example, a beginning of the granted allocation may be determined, for example, based on a sum of the value of the Allocation duration field 402 (FIG. 4) and the value of the duration field 302 (FIG. 3) of the grant frame 300 (FIG. 3). For example, the sum of the value of the Allocation duration field 402 (FIG. 4) and the value of the duration field 302 (FIG. 3) of the grant frame 300 (FIG. 3) may indicate a time offset from a PHY-TXEND.indication primitive of the Grant frame 300 (FIG. 3), when the STA transmitting the Grant frame 300 (FIG. 3), e.g., device 102, is to attempt to initiate access for communication with the STA indicated by the RA field 304 (FIG. 3) of the Grant frame 300 (FIG. 3), e.g., device 140. Additionally or alternatively, for example, the sum of the value of the Allocation duration field 402 (FIG. 4) and the value of the duration field 302 (FIG. 3) of the grant frame 300 (FIG. 3) may indicate a time offset from a PHY-TXEND.indication primitive of the Grant frame 300 (FIG. 3), when the STA transmitting the Grant frame 300 (FIG. 3), e.g., device 102, may be ready to receive a transmission attempt from the STA indicated by the RA field 304 (FIG. 3) of the Grant frame 300 (FIG. 3), e.g., device 140.

In another example, device 102 may transmit grant frame 300 (FIG. 3), e.g., to device 140, for example, to grant an allocation within the same current TxOP, e.g., as described above.

According to this example, device 102 may set the grant frame 300 (FIG. 3) to include the Allocation Duration field 402 (FIG. 4) set to a predefined value, which is not within the predefined range of values, e.g., the value 32 768. According to this example, the predefined value of the Allocation duration field 402 (FIG. 4) may indicate that a remainder of the TxOP is to be relinquished, for example, to device 140, e.g., as described above.

In some demonstrative embodiments, any other additional or alternative purposes may be defined for the grant frame.

In some demonstrative embodiments, device 102 may transmit a grant frame, e.g., grant frame 300 (FIG. 3), for example, during a SP.

In some demonstrative embodiments, when the Dynamic Allocation Info subfield is transmitted within a Grant frame by a source STA of an SP, the Allocation Duration subfield is set to 32768.

In one example, device 102 may perform the functionality of a source STA of an SP. Device 102 may transmit grant frame 300 (FIG. 3) including the Dynamic Allocation Info subfield 308 (FIG. 3) including the Allocation Duration subfield 402 (FIG. 4) set to 32768.

In some demonstrative embodiments, devices 102 and/or 140 may be configured to communicate the grant frame 300 (FIG. 3), for example, to allocate a Grant Period (GP).

In some demonstrative embodiments, during an SP between a source DMG STA, e.g., device 102, and a destination DMG STA, e.g., device 140, the source DMG STA may transmit a Grant frame, e.g., grant frame 300 (FIG. 3), to the destination DMG STA, for example, to relinquish the remainder of the SP to the destination DMG STA.

In some demonstrative embodiments, in the Allocation Info field of the transmitted Grant frame, e.g., Allocation Info field 308 (FIG. 3) of grant frame 300 (FIG. 3), the source DMG STA shall set the source AID field, e.g., source AID field 410 (FIG. 4), to the AID of the destination DMG STA, the destination AID field, e.g., destination AID field 412 (FIG. 4), to the AID of the source DMG STA, the Allocation Type field, e.g., Allocation Type field 409 (FIG. 4), set to indicate SP, and the Duration field, e.g., duration field 302 (FIG. 3), set to the time remaining in the SP minus TXTIME (Grant frame) minus a Short Inter Frame Space (SIFS) Time.

In some demonstrative embodiments, the Allocation Duration field, e.g., Allocation Duration field 402 (FIG. 4), in the Grant frame, e.g., grant frame 300 (FIG. 3), shall be set as defined above, e.g., to the value 32768.

In some demonstrative embodiments, upon transmission of the Grant frame with the Beamforming Training field equal to 0, for the remainder of the SP the roles of source DMG STA and destination DMG STA are swapped between the STAs.

In some demonstrative embodiments, during a TxOP between a TXOP holder, e.g., device 102, and a TXOP responder, e.g., device 140, the TXOP holder may transmit a Grant frame, e.g., grant frame 300 (FIG. 3), to the TXOP responder to relinquish the remainder of the TXOP to the TXOP responder.

In some demonstrative embodiments, in the transmitted Grant frame, e.g., grant frame 300 (FIG. 3), the TXOP holder shall set a source AID field, e.g., source AID field 410 (FIG. 4), to the AID of the TXOP responder, the destination AID field, e.g., destination AID field 412 (FIG. 4), to the AID of the TXOP holder, the Allocation Type field, e.g., Allocation type field 409 (FIG. 4), set to indicate CBAP, and the Duration field, e.g., duration field 302 (FIG. 3), set to the time remaining in the TXOP minus TXTIME (Grant frame) minus a Short Inter Frame Space (SIFS) Time.

In some demonstrative embodiments, the Allocation Duration field, e.g., allocation duration field 402 (FIG. 4), in the Grant frame shall be set, for example, as described above. For example, the Allocation Duration field 402 (FIG. 4) in the Grant frame 300 (FIG. 3) may be set to the predefined value, e.g., 32 768, for example, to indicate the grant frame 300 (FIG. 3) is to relinquish the remainder of the TxOP to the TxOP responder, e.g., as described above.

In some demonstrative embodiments, upon transmission of the Grant frame with a Beamforming Training field equal to 0, for the remainder the TxOP the roles of TXOP holder and TXOP responder are swapped between the STAs.

In some demonstrative embodiments, controller 124 may cause a first wireless station implemented by device 102 to generate a grant frame, e.g., grant frame 300 (FIG. 3), including a duration field, e.g., duration field 302 (FIG. 3), and a dynamic allocation information field, e.g., dynamic allocation info field 400 (FIG. 4), including an allocation duration subfield, e.g., allocation duration subfield 402 (FIG. 4), being set to a value within a predefined range of values, e.g., the range 0-32767, for example, when the grant frame is to grant to a second wireless station, e.g., device 140, a period after a TxOP, e.g., as described above.

In some demonstrative embodiments, controller 124 may cause the first wireless station implemented by device 102 to generate the grant frame including the allocation duration subfield, e.g., allocation duration subfield 402 (FIG. 4), being set to a predefined value, e.g., the value 32768, which is not within the predefined range of values, for example, when the grant frame is to grant to the second wireless station, e.g., device 140, a period within the TxOP, e.g., as described above.

In some demonstrative embodiments, controller 124 may causer the first wireless station to transmit the grant frame during the TxOP, e.g., via radio 114.

In some demonstrative embodiments, controller 124 may cause the first wireless station to transmit the grant frame in a CBAP, e.g., as described above.

In some demonstrative embodiments, controller 124 may cause the first wireless station to operate as a holder of the TxOP, e.g., as described above.

For example, controller 124 may cause device 102 to transmit the grant frame 300 (FIG. 3) including the allocation duration subfield 402 (FIG. 4) set to the predefined value, e.g., 32628, for example, to indicate that a remainder of the TxOP is to be relinquished from the TxOP holder to a TxOP responder, e.g., device 140.

In some demonstrative embodiments, controller 124 may cause the first wireless station to set a value of the duration field 302 (FIG. 3) to a result of subtracting from a time remaining in the TxOP a transmit time of the grant frame 300 (FIG. 3) and a Short Inter Frame Space (SIFS) time, e.g., as described above.

In some demonstrative embodiments, controller 124 may cause the first wireless station to set the allocation duration subfield to the value within the predefined range of values, e.g., to a value within the range 0-32627, to indicate that the first wireless station is to attempt to initiate access to communicate with the second wireless station, e.g., device 140, at a time which is based on a sum of the value of the allocation duration subfield 402 (FIG. 4) and a value of the duration field 302 (FIG. 3), e.g., as described above.

In some demonstrative embodiments, controller 154 may cause the second wireless station, e.g., which may be implemented by device 140, to process a reception of the grant frame from the first wireless station. For example, controller 154 may cause radio 144 and/or message processor 158 to process the reception of the grant frame 300 (FIG. 3) including the dynamic allocation subfield 402 (FIG. 4) set to the value within the predefined range of values, when the grant frame 300 (FIG. 3) is to grant the period after the TxOP, or including the allocation duration subfield 402 (FIG. 4) set to the predefined value which is not within the predefined range of values, when the grant frame 300 (FIG. 3) is to grant the period within the TxOP, e.g., as described above.

In some demonstrative embodiments, controller 154 may cause the second wireless station, e.g., which may be implemented by device 140, to, based on the allocation duration subfield, process a communication in the period after the TxOP or in the period within the TxOP, e.g., as described above.

In some demonstrative embodiments, controller 124 may cause a first wireless station implemented by device 102 to generate a grant frame, e.g., grant frame 300 (FIG. 3), including a duration field, e.g., duration field 302 (FIG. 3), and a dynamic allocation information field, e.g., dynamic allocation info field 400 (FIG. 4), including an allocation duration subfield, e.g., allocation duration subfield 402 (FIG. 4), being set to a predefined value, e.g., the value 32768, and the duration field, e.g., duration field 302 (FIG. 3), being set to a result of subtracting from a time remaining in a SP a transmit time of the grant frame 300 (FIG. 3) and a SIFS, for example, the difference between the time remaining in the SP and the sum of the transmit time of the grant frame 300 (FIG. 3) and a SIFS, e.g., as described above.

In some demonstrative embodiments, controller 124 may cause the first wireless station to transmit the grant frame during the SP, e.g., via radio 114.

In some demonstrative embodiments, controller 124 may cause the first wireless station to operate as a source station of the SP, and to relinquish a remainder of the SP from the source station to a destination station of the SP, e.g., a second wireless station implemented by device 140.

In some demonstrative embodiments, controller 154 may cause the second wireless station, e.g., which may be implemented by device 140, to process a reception of the grant frame from the first wireless station. For example, controller 154 may cause radio 144 and/or message processor 158 to process the reception of the grant frame 300 (FIG. 3) including the dynamic allocation subfield 402 (FIG. 4) set to the predefined value, e.g., 32768, for example, during the SP, e.g., as described above.

In some demonstrative embodiments, controller 154 may cause the second wireless station, e.g., which may be implemented by device 140, to perform the role of the source station of the SP for a remainder of the SP, e.g., as described above.

Figure 6:
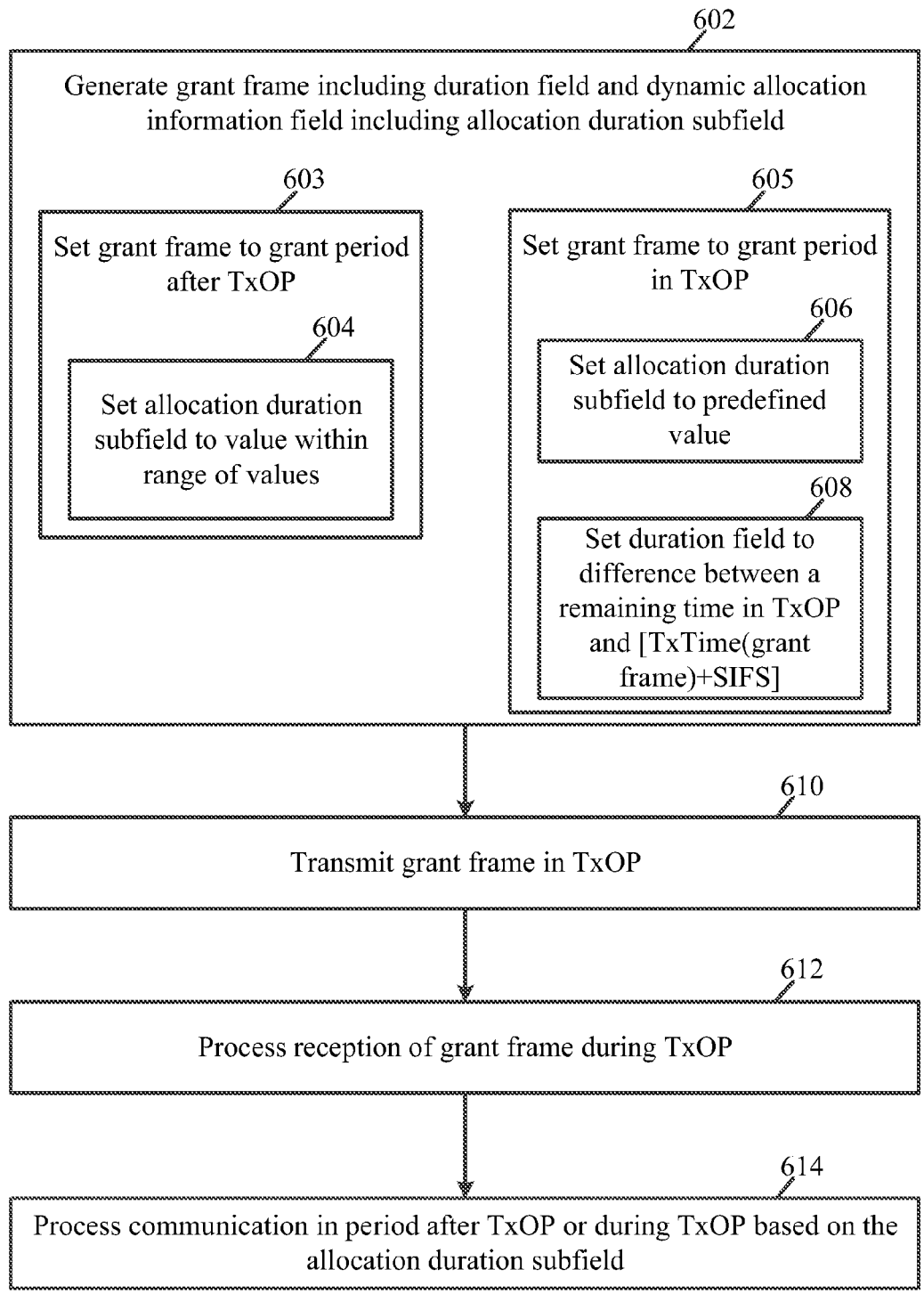
FIG. 6 is a schematic flowchart illustration of a method of dynamic allocation using a grant frame, in accordance with some demonstrative embodiments.

Reference is made to FIG. 6, which schematically illustrates a method of dynamic allocation using a grant frame, in accordance with some demonstrative embodiments. For example, one or more of the operations of the method of FIG. 6 may be performed by one or more elements of a system, e.g., system 100 (FIG. 1), for example, one or more wireless devices, e.g., device 102 (FIG. 1) and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

In some demonstrative embodiments, one or more operations of the method of FIG. 6 may be performed during a TxOP, e.g., within a CBAP.

As indicated at block 602, the method may include generating a grant frame including a duration field and a dynamic allocation information field, the dynamic allocation information field including an allocation duration subfield. For example, controller 124 (FIG. 1) may cause message processor 128 (FIG. 1) to generate grant frame 300 (FIG. 3), e.g., as described above.

As indicated at block 603, the method may include setting the grant frame to grant to a second wireless station a period after the TxOP.

As indicated at block 604, the method may include setting the allocation duration subfield to a value within a predefined range of values, for example, when the grant frame is to grant to the second wireless station the period after the TxOP. For example, controller 124 (FIG. 1) may cause message processor 128 (FIG. 1) to set the allocation duration subfield 402 (FIG. 4) to a value within the range of values 0-32627, for example, when the grant frame 300 (FIG. 3) is to grant to the second wireless station the period after the TxOP, e.g., as described above.

As indicated at block 605, the method may include setting the grant frame to grant to the second wireless station a period within the TxOP.

As indicated at block 606, the method may include setting the allocation duration subfield to a predefined value, which is not within the predefined range of values, for example, when the grant frame is to grant to the second wireless station a period within the TxOP. For example, controller 124 (FIG. 1) may cause message processor 128 (FIG. 1) to set the allocation duration subfield 402 (FIG. 4) to the value 32628, for example, when the grant frame 300 (FIG. 3) is to grant to a second wireless station a period within the TxOP, e.g., as described above.

As indicated at block 608, the method may include setting a value of the duration field to a result of subtracting from a time remaining in the TxOP a transmit time of the grant frame and a Short Inter Frame Space (SIFS) time. For example, controller 124 (FIG. 1) may cause message processor 128 (FIG. 1) to set the duration field 302 (FIG. 3) to a result of subtracting from a time remaining in the TxOP a transmit time of the grant frame 300 (FIG. 3) and a SIFS, e.g., as described above.

As indicated at block 610, the method may include transmitting the grant frame during the TxOP. For example, controller 124 (FIG. 1) may cause radio 114 (FIG. 1) to transmit the grant frame 300 (FIG. 3) during the TxOP, e.g., as described above.

As indicated at block 612, the method may include processing reception of the grant frame during the TxOP. For example, controller 154 (FIG. 1) may cause radio 144 (FIG. 1) to process reception the grant frame 300 (FIG. 3) during the TxOP, e.g., as described above.

As indicated at block 614, the method may include processing communication in the period after the TxOP or in the period within the TxOP, for example, based on the allocation duration subfield. For example, controller 154 (FIG. 1) may cause wireless communication device 140 (FIG. 1) to process communication in the period after the TxOP or in the period within the TxOP, for example, based on the allocation duration subfield 402 (FIG. 4) of the received grant frame 300 (FIG. 3), e.g., as described above.

Figure 7:
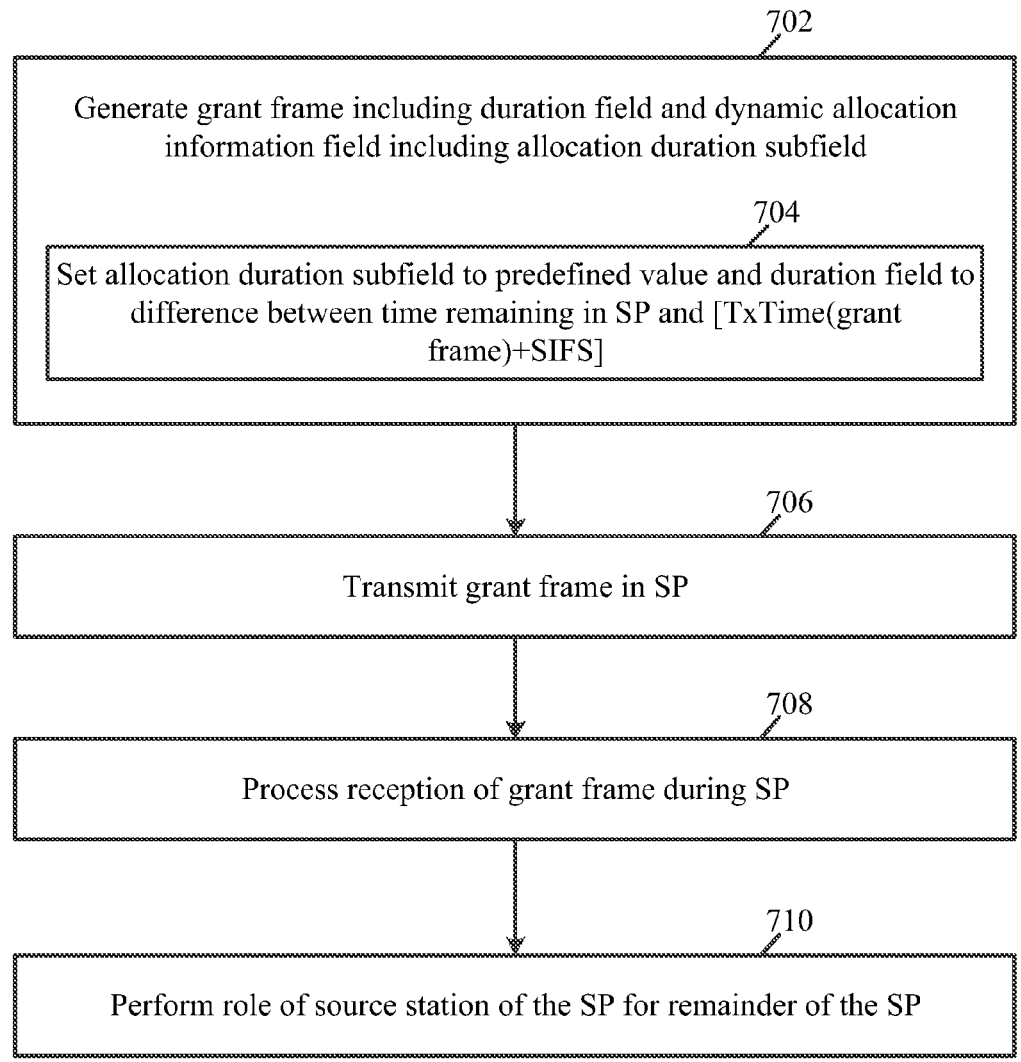
FIG. 7 is a schematic flowchart illustration of a method of dynamic allocation using a grant frame, in accordance with some demonstrative embodiments.

Reference is made to FIG. 7, which schematically illustrates a method of dynamic allocation using a grant frame, in accordance with some demonstrative embodiments. For example, one or more of the operations of the method of FIG. 7 may be performed by one or more elements of a system, e.g., system 100 (FIG. 1), for example, one or more wireless devices, e.g., device 102 (FIG. 1) and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

In some demonstrative embodiments, one or more operations of the method of FIG. 6 may be performed during a SP.

As indicated at block 702, the method may include generating a grant frame including a duration field and a dynamic allocation information field, the dynamic allocation information field including an allocation duration subfield. For example, controller 124 (FIG. 1) may cause message processor 128 (FIG. 1) to generate grant frame 300 (FIG. 3), e.g., as described above.

As indicated at block 704, the method may include setting the allocation duration subfield to a predefined value, and setting the duration field to a result of subtracting from a time remaining in the SP a transmit time of the grant frame and a SIFS time. For example, controller 124 (FIG. 1) may cause message processor 128 (FIG. 1) to set the allocation duration subfield 402 (FIG. 4) to the value 32628, and to set the value of duration field 302 (FIG. 3) to a result of subtracting from a time remaining in the SP a transmit time of the grant frame 300 (FIG. 3) and a SIFS time, e.g., as described above.

As indicated at block 706, the method may include transmitting the grant frame during the SP. For example, controller 124 (FIG. 1) may cause radio 114 (FIG. 1) to transmit the grant frame 300 (FIG. 3) during the SP, e.g., as described above.

As indicated at block 708, the method may include processing reception of the grant frame during the SP. For example, controller 154 (FIG. 1) may cause radio 144 (FIG. 1) to process reception the grant frame 300 (FIG. 3) during the SP, e.g., as described above.

As indicated at block 710, the method may include performing the role of a source station of the SP for a remainder of the SP. For example, controller 154 (FIG. 1) may cause wireless communication device 140 (FIG. 1) to perform the role of a source station of the SP for a remainder of the SP e.g., as described above.

Figure 8:
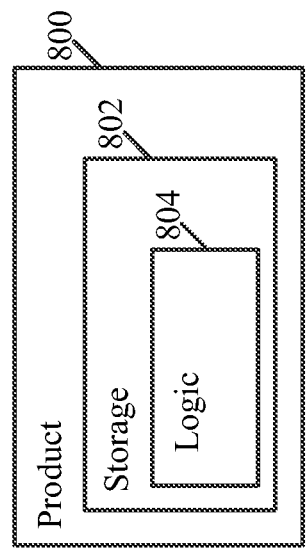
FIG. 8 is a schematic illustration of a product of manufacture, in accordance with some demonstrative embodiments.

Reference is made to FIG. 8, which schematically illustrates a product of manufacture 800, in accordance with some demonstrative embodiments. Product 800 may include a non-transitory machine-readable storage medium 802 to store logic 804, which may be used, for example, to perform at least part of the functionality of devices 102 and/or 140 (FIG. 1), transmitters 118 and/or 148 (FIG. 1), receivers 116 and/or 146 (FIG. 1), controllers 124 and/or 154 (FIG. 1), message processors 128 and/or 158 (FIG. 1) and/or to perform one or more operations and/or communications described above with reference to FIGS. 5, 6 and/or 7. The phrase "non-transitory machine-readable medium" is directed to include all computer-readable media, with the sole exception being a transitory propagating signal.

In some demonstrative embodiments, product 800 and/or machine-readable storage medium 802 may include one or more types of computer-readable storage media capable of storing data, including volatile memory, non-volatile memory, removable or non-removable memory, erasable or non-erasable memory, writeable or re-writeable memory, and the like. For example, machine-readable storage medium 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising one or more processors including circuitry configured to cause a first wireless station to generate a grant frame including a duration field and a dynamic allocation information field, the dynamic allocation information field including an allocation duration subfield, the allocation duration subfield being set to a value within a predefined range of values, when the grant frame is to grant to a second wireless station a period after a Transmit Opportunity (TxOP), the allocation duration subfield being set to a predefined value which is not within the predefined range of values, when the grant frame is to grant to the second wireless station a period within the TxOP; and transmit the grant frame during the TxOP.

Example 2 includes the subject matter of Example 1, and optionally, wherein the apparatus is configured to cause the first wireless station to operate as a holder of the TxOP, the grant frame including the allocation duration subfield set to the predefined value to indicate that a remainder of the TxOP is to be relinquished from the TxOP holder to a TxOP responder.

Example 3 includes the subject matter of Example 2, and optionally, wherein the apparatus is configured to cause the first wireless station to set a value of the duration field to a result of subtracting from a time remaining in the TxOP a transmit time of the grant frame and a Short Inter Frame Space (SIFS) time.

Example 4 includes the subject matter of Example 1, and optionally, wherein the apparatus is configured to cause the first wireless station to set the allocation duration subfield to the value within the predefined range of values to indicate the first wireless station is to attempt to initiate access to communicate with the second wireless station at a time which is based on a sum of the value of the allocation duration subfield and a value of the duration field.

Example 5 includes the subject matter of any one of Examples 1-4, and optionally, wherein the apparatus is to cause the first wireless station to transmit the grant frame in a Contention Based Access period (CBAP).

Example 6 includes the subject matter of any one of Examples 1-5, and optionally, wherein the predefined value is 32768.

Example 7 includes the subject matter of any one of Examples 1-6, and optionally, wherein the range of values includes the range of 0 to 32767.

Example 8 includes the subject matter of any one of Examples 1-7, and optionally, wherein the first wireless station is a Direct Multi Gigabit (DMG) station (STA).

Example 9 includes the subject matter of any one of Examples 1-8, and optionally, including one or more antennas, and a memory.

Example 10 includes an apparatus comprising one or more processors including circuitry configured to cause a first wireless station to process a reception of a grant frame from a second wireless station, the grant frame grant frame including a duration field and a dynamic allocation information field, the dynamic allocation information field including an allocation duration subfield, the allocation duration subfield being set to a value within a predefined range of values, when the grant frame is to grant a period after a Transmit Opportunity (TxOP), the allocation duration subfield being set to a predefined value which is not within the predefined range of values, when the grant frame is to grant a period within the TxOP; and based on the allocation duration subfield, to process a communication in the period after the TxOP or in the period within the TxOP.

Example 11 includes the subject matter of Example 10, and optionally, wherein the apparatus is configured to cause the first wireless station to operate as a responder of the TxOP, the grant frame including the allocation duration subfield set to the predefined value to indicate that a remainder of the TxOP is to be relinquished from a TxOP holder to the TxOP responder.

Example 12 includes the subject matter of Example 11, and optionally, wherein a value of the duration field is a result of subtracting from a time remaining in the TxOP a transmit time of the grant frame and a Short Inter Frame Space (SIFS) time.

Example 13 includes the subject matter of Example 10, and optionally, wherein allocation duration subfield is set to the value within the predefined range of values to indicate the second wireless station is to attempt to initiate access to communicate with the first wireless station at a time which is based on a sum of the value of the allocation duration subfield and a value of the duration field.

Example 14 includes the subject matter of any one of Examples 10-13, and optionally, wherein the apparatus is to cause the first wireless station to process reception of the grant frame in a Contention Based Access period (CBAP).

Example 15 includes the subject matter of any one of Examples 10-14, and optionally, wherein the predefined value is 32768.

Example 16 includes the subject matter of any one of Examples 10-15, and optionally, wherein the range of values includes the range of 0 to 32767.

Example 17 includes the subject matter of any one of Examples 10-16, and optionally, wherein the first wireless station is a Direct Multi Gigabit (DMG) station (STA).

Example 18 includes the subject matter of any one of Examples 10-17, and optionally, including one or more antennas, and a memory.

Example 19 includes an apparatus comprising one or more processors including circuitry configured to cause a first wireless station to generate a grant frame including a duration field and a dynamic allocation information field, the dynamic allocation information field including an allocation duration subfield set to a predefined value, the duration field being set to a result of subtracting from a time remaining in a Service Period (SP) a transmit time of the grant frame and a Short Inter Frame Space time; and transmit the grant frame during the SP.

Example 20 includes the subject matter of Example 19, and optionally, wherein the apparatus is configured to cause the first wireless station to operate as source station of the SP, and to relinquish a remainder of the SP from the source station to a destination station of the SP.

Example 21 includes the subject matter of Example 19 or 20, and optionally, wherein the predefined value is 32768.

Example 22 includes the subject matter of any one of Examples 19-21, and optionally, wherein the first wireless station is a Direct Multi Gigabit (DMG) station (STA).

Example 23 includes the subject matter of any one of Examples 19-22, and optionally, including one or more antennas, and a memory.

Example 24 includes an apparatus comprising one or more processors including circuitry configured to cause a first wireless station to process a reception of a grant frame from a second wireless station, the grant frame including a duration field and a dynamic allocation information field, the dynamic allocation information field including an allocation duration subfield set to a predefined value, the duration field being set to a result of subtracting from a time remaining in a Service Period (SP) a transmit time of the grant frame and a Short Inter Frame Space time; and perform the role of a source station of the SP for a remainder of the SP.

Example 25 includes the subject matter of Example 24, and optionally, wherein the predefined value is 32768.

Example 26 includes the subject matter of Example 24 or 25, and optionally, wherein the first wireless station is a Direct Multi Gigabit (DMG) station (STA).

Example 27 includes the subject matter of any one of Examples 24-26, and optionally, including one or more antennas, and a memory.

Example 28 includes a system comprising a first wireless station, the first wireless station including one or more antennas; a memory; a message processor to generate a grant frame including a duration field and a dynamic allocation information field, the dynamic allocation information field including an allocation duration subfield, the allocation duration subfield being set to a value within a predefined range of values, when the grant frame is to grant to a second wireless station a period after a Transmit Opportunity (TxOP), the allocation duration subfield being set to a predefined value which is not within the predefined range of values, when the grant frame is to grant to the second wireless station a period within the TxOP; and a radio to transmit the grant frame during the TxOP.

Example 29 includes the subject matter of Example 28, and optionally, wherein the first wireless station is to operate as a holder of the TxOP, the grant frame including the allocation duration subfield set to the predefined value to indicate that a remainder of the TxOP is to be relinquished from the TxOP holder to a TxOP responder.

Example 30 includes the subject matter of Example 29, and optionally, wherein the first wireless station is to set a value of the duration field to a result of subtracting from a time remaining in the TxOP a transmit time of the grant frame and a Short Inter Frame Space (SIFS) time.

Example 31 includes the subject matter of Example 28, and optionally, wherein the first wireless station is to set the allocation duration subfield to the value within the predefined range of values to indicate the first wireless station is to attempt to initiate access to communicate with the second wireless station at a time which is based on a sum of the value of the allocation duration subfield and a value of the duration field.

Example 32 includes the subject matter of any one of Examples 28-31, and optionally, wherein the radio is to transmit the grant frame in a Contention Based Access period (CBAP).

Example 33 includes the subject matter of any one of Examples 28-32, and optionally, wherein the predefined value is 32768.

Example 34 includes the subject matter of any one of Examples 28-33, and optionally, wherein the range of values includes the range of 0 to 32767.

Example 35 includes the subject matter of any one of Examples 28-34, and optionally, wherein the first wireless station is a Direct Multi Gigabit (DMG) station (STA).

Example 36 includes a system of wireless communication, the system comprising one or more antennas; a memory; and a first wireless station to process a reception of a grant frame from a second wireless station, the grant frame grant frame including a duration field and a dynamic allocation information field, the dynamic allocation information field including an allocation duration subfield, the allocation duration subfield being set to a value within a predefined range of values, when the grant frame is to grant a period after a Transmit Opportunity (TxOP), the allocation duration subfield being set to a predefined value which is not within the predefined range of values, when the grant frame is to grant a period within the TxOP; and, based on the allocation duration subfield, to process a communication in the period after the TxOP or in the period within the TxOP.

Example 37 includes the subject matter of Example 36, and optionally, wherein the first wireless station is to operate as a responder of the TxOP, the grant frame including the allocation duration subfield set to the predefined value to indicate that a remainder of the TxOP is to be relinquished from a TxOP holder to the TxOP responder.

Example 38 includes the subject matter of Example 37, and optionally, wherein a value of the duration field is a result of subtracting from a time remaining in the TxOP a transmit time of the grant frame and a Short Inter Frame Space (SIFS) time.

Example 39 includes the subject matter of Example 36, and optionally, wherein allocation duration subfield is set to the value within the predefined range of values to indicate the second wireless station is to attempt to initiate access to communicate with the first wireless station at a time which is based on a sum of the value of the allocation duration subfield and a value of the duration field.

Example 40 includes the subject matter of any one of Examples 36-39, and optionally, wherein the first wireless station is to process reception of the grant frame in a Contention Based Access period (CBAP).

Example 41 includes the subject matter of any one of Examples 36-40, and optionally, wherein the predefined value is 32768.

Example 42 includes the subject matter of any one of Examples 36-41, and optionally, wherein the range of values includes the range of 0 to 32767.

Example 43 includes the subject matter of any one of Examples 36-42, and optionally, wherein the first wireless station is a Direct Multi Gigabit (DMG) station (STA).

Example 44 includes a system comprising a first wireless station, the first wireless station including one or more antennas; a memory; a message processor to generate a grant frame including a duration field and a dynamic allocation information field, the dynamic allocation information field including an allocation duration subfield set to a predefined value, the duration field being set to a result of subtracting from a time remaining in a Service Period (SP) a transmit time of the grant frame and a Short Inter Frame Space time; and a radio to transmit the grant frame during the SP.

Example 45 includes the subject matter of Example 44, and optionally, wherein the first wireless station is to operate as source station of the SP, and to relinquish a remainder of the SP from the source station to a destination station of the SP.

Example 46 includes the subject matter of Example 44 or 45, and optionally, wherein the predefined value is 32768.

Example 47 includes the subject matter of any one of Examples 44-46, and optionally, wherein the first wireless station is a Direct Multi Gigabit (DMG) station (STA).

Example 48 includes a system of wireless communication, the system comprising one or more antennas; a memory; and a first wireless station to process a reception of a grant frame from a second wireless station, the grant frame including a duration field and a dynamic allocation information field, the dynamic allocation information field including an allocation duration subfield set to a predefined value, the duration field being set to a result of subtracting from a time remaining in a Service Period (SP) a transmit time of the grant frame and a Short Inter Frame Space time; and to perform the role of a source station of the SP for a remainder of the SP.

Example 49 includes the subject matter of Example 48, and optionally, wherein the predefined value is 32768.

Example 50 includes the subject matter of Example 48 or 49, and optionally, wherein the first wireless station is a Direct Multi Gigabit (DMG) station (STA).

Example 51 includes a method to be performed by a first wireless station, the method comprising generating a grant frame including a duration field and a dynamic allocation information field, the dynamic allocation information field including an allocation duration subfield, the allocation duration subfield being set to a value within a predefined range of values, when the grant frame is to grant to a second wireless station a period after a Transmit Opportunity (TxOP), the allocation duration subfield being set to a predefined value which is not within the predefined range of values, when the grant frame is to grant to the second wireless station a period within the TxOP; and transmitting the grant frame during the TxOP.

Example 52 includes the subject matter of Example 51, and optionally, wherein the first wireless station is to operate as a holder of the TxOP, the grant frame including the allocation duration subfield set to the predefined value to indicate that a remainder of the TxOP is to be relinquished from the TxOP holder to a TxOP responder.

Example 53 includes the subject matter of Example 52, and optionally, comprising setting a value of the duration field to a result of subtracting from a time remaining in the TxOP a transmit time of the grant frame and a Short Inter Frame Space (SIFS) time.

Example 54 includes the subject matter of Example 51, and optionally, comprising setting the allocation duration subfield to the value within the predefined range of values to indicate the first wireless station is to attempt to initiate access to communicate with the second wireless station at a time which is based on a sum of the value of the allocation duration subfield and a value of the duration field.

Example 55 includes the subject matter of any one of Examples 51-54, and optionally, comprising transmitting the grant frame in a Contention Based Access period (CBAP).

Example 56 includes the subject matter of any one of Examples 51-55, and optionally, wherein the predefined value is 32768.

Example 57 includes the subject matter of any one of Examples 51-56, and optionally, wherein the range of values includes the range of 0 to 32767.

Example 58 includes the subject matter of any one of Examples 51-57, and optionally, wherein the first wireless station is a Direct Multi Gigabit (DMG) station (STA).

Example 59 includes a method to be performed by a first wireless station, the method comprising processing a reception of a grant frame from a second wireless station, the grant frame grant frame including a duration field and a dynamic allocation information field, the dynamic allocation information field including an allocation duration subfield, the allocation duration subfield being set to a value within a predefined range of values, when the grant frame is to grant a period after a Transmit Opportunity (TxOP), the allocation duration subfield being set to a predefined value which is not within the predefined range of values, when the grant frame is to grant a period within the TxOP; and based on the allocation duration subfield, processing a communication in the period after the TxOP or in the period within the TxOP.

Example 60 includes the subject matter of Example 59, and optionally, wherein the first wireless station to operate as a responder of the TxOP, the grant frame including the allocation duration subfield set to the predefined value to indicate that a remainder of the TxOP is to be relinquished from a TxOP holder to the TxOP responder.

Example 61 includes the subject matter of Example 60, and optionally, wherein a value of the duration field is a result of subtracting from a time remaining in the TxOP a transmit time of the grant frame and a Short Inter Frame Space (SIFS) time.

Example 62 includes the subject matter of Example 59, and optionally, wherein allocation duration subfield is set to the value within the predefined range of values to indicate the second wireless station is to attempt to initiate access to communicate with the first wireless station at a time which is based on a sum of the value of the allocation duration subfield and a value of the duration field.

Example 63 includes the subject matter of any one of Examples 59-62, and optionally, comprising processing reception of the grant frame in a Contention Based Access period (CBAP).

Example 64 includes the subject matter of any one of Examples 59-63, and optionally, wherein the predefined value is 32768.

Example 65 includes the subject matter of any one of Examples 59-64, and optionally, wherein the range of values includes the range of 0 to 32767.

Example 66 includes the subject matter of any one of Examples 59-65, and optionally, wherein the first wireless station is a Direct Multi Gigabit (DMG) station (STA).

Example 67 includes a method to be performed by a first wireless station, the method comprising generating a grant frame including a duration field and a dynamic allocation information field, the dynamic allocation information field including an allocation duration subfield set to a predefined value, the duration field being set to a result of subtracting from a time remaining in a Service Period (SP) a transmit time of the grant frame and a Short Inter Frame Space time; and transmitting the grant frame during the SP.

Example 68 includes the subject matter of Example 67, and optionally, comprising operating the first wireless station as source station of the SP, and relinquishing a remainder of the SP from the source station to a destination station of the SP.

Example 69 includes the subject matter of Example 67 or 68, and optionally, wherein the predefined value is 32768.

Example 70 includes the subject matter of any one of Examples 67-69, and optionally, wherein the first wireless station is a Direct Multi Gigabit (DMG) station (STA).

Example 71 includes a method to be performed by a first wireless station, the method comprising processing a reception of a grant frame from a second wireless station, the grant frame including a duration field and a dynamic allocation information field, the dynamic allocation information field including an allocation duration subfield set to a predefined value, the duration field being set to a result of subtracting from a time remaining in a Service Period (SP) a transmit time of the grant frame and a Short Inter Frame Space time; and performing the role of a source station of the SP for a remainder of the SP.

Example 72 includes the subject matter of Example 71, and optionally, wherein the predefined value is 32768.

Example 73 includes the subject matter of Example 71 or 72, and optionally, wherein the first wireless station is a Direct Multi Gigabit (DMG) station (STA).

Example 74 includes a product including one or more tangible computer-readable non-transitory storage media comprising computer-executable instructions operable to, when executed by at least one computer processor, enable the at least one computer processor to implement a method at a first wireless station, the method comprising generating a grant frame including a duration field and a dynamic allocation information field, the dynamic allocation information field including an allocation duration subfield, the allocation duration subfield being set to a value within a predefined range of values, when the grant frame is to grant to a second wireless station a period after a Transmit Opportunity (TxOP), the allocation duration subfield being set to a predefined value which is not within the predefined range of values, when the grant frame is to grant to the second wireless station a period within the TxOP; and transmitting the grant frame during the TxOP.

Example 75 includes the subject matter of Example 74, and optionally, wherein the first wireless station is to operate as a holder of the TxOP, the grant frame including the allocation duration subfield set to the predefined value to indicate that a remainder of the TxOP is to be relinquished from the TxOP holder to a TxOP responder.

Example 76 includes the subject matter of Example 75, and optionally, wherein the method comprises setting a value of the duration field to a result of subtracting from a time remaining in the TxOP a transmit time of the grant frame and a Short Inter Frame Space (SIFS) time.

Example 77 includes the subject matter of Example 74, and optionally, wherein the method comprises setting the allocation duration subfield to the value within the predefined range of values to indicate the first wireless station is to attempt to initiate access to communicate with the second wireless station at a time which is based on a sum of the value of the allocation duration subfield and a value of the duration field.

Example 78 includes the subject matter of any one of Examples 74-77, and optionally, wherein the method comprises transmitting the grant frame in a Contention Based Access period (CBAP).

Example 79 includes the subject matter of any one of Examples 74-78, and optionally, wherein the predefined value is 32768.

Example 80 includes the subject matter of any one of Examples 74-79, and optionally, wherein the range of values includes the range of 0 to 32767.

Example 81 includes the subject matter of any one of Examples 74-80, and optionally, wherein the first wireless station is a Direct Multi Gigabit (DMG) station (STA).

Example 82 includes a product including one or more tangible computer-readable non-transitory storage media comprising computer-executable instructions operable to, when executed by at least one computer processor, enable the at least one computer processor to implement a method at a first wireless station, the method comprising processing a reception of a grant frame from a second wireless station, the grant frame grant frame including a duration field and a dynamic allocation information field, the dynamic allocation information field including an allocation duration subfield, the allocation duration subfield being set to a value within a predefined range of values, when the grant frame is to grant a period after a Transmit Opportunity (TxOP), the allocation duration subfield being set to a predefined value which is not within the predefined range of values, when the grant frame is to grant a period within the TxOP; and based on the allocation duration subfield, processing a communication in the period after the TxOP or in the period within the TxOP.

Example 83 includes the subject matter of Example 82, and optionally, wherein the first wireless station is to operate as a responder of the TxOP, the grant frame including the allocation duration subfield set to the predefined value to indicate that a remainder of the TxOP is to be relinquished from a TxOP holder to the TxOP responder.

Example 84 includes the subject matter of Example 83, and optionally, wherein a value of the duration field is a result of subtracting from a time remaining in the TxOP a transmit time of the grant frame and a Short Inter Frame Space (SIFS) time.

Example 85 includes the subject matter of Example 82, and optionally, wherein allocation duration subfield is set to the value within the predefined range of values to indicate the second wireless station is to attempt to initiate access to communicate with the first wireless station at a time which is based on a sum of the value of the allocation duration subfield and a value of the duration field.

Example 86 includes the subject matter of any one of Examples 82-85, and optionally, wherein the method comprises processing reception of the grant frame in a Contention Based Access period (CBAP).

Example 87 includes the subject matter of any one of Examples 82-86, and optionally, wherein the predefined value is 32768.

Example 88 includes the subject matter of any one of Examples 82-87, and optionally, wherein the range of values includes the range of 0 to 32767.

Example 89 includes the subject matter of any one of Examples 82-88, and optionally, wherein the first wireless station is a Direct Multi Gigabit (DMG) station (STA).

Example 90 includes a product including one or more tangible computer-readable non-transitory storage media comprising computer-executable instructions operable to, when executed by at least one computer processor, enable the at least one computer processor to implement a method at a first wireless station, the method comprising generating a grant frame including a duration field and a dynamic allocation information field, the dynamic allocation information field including an allocation duration subfield set to a predefined value, the duration field being set to a result of subtracting from a time remaining in a Service Period (SP) a transmit time of the grant frame and a Short Inter Frame Space time; and transmitting the grant frame during the SP.

Example 91 includes the subject matter of Example 90, and optionally, wherein the method comprises operating the first wireless station as source station of the SP, and relinquishing a remainder of the SP from the source station to a destination station of the SP.

Example 92 includes the subject matter of Example 90 or 91, and optionally, wherein the predefined value is 32768.

Example 93 includes the subject matter of any one of Examples 90-92, and optionally, wherein the first wireless station is a Direct Multi Gigabit (DMG) station (STA).

Example 94 includes a product including one or more tangible computer-readable non-transitory storage media comprising computer-executable instructions operable to, when executed by at least one computer processor, enable the at least one computer processor to implement a method at a first wireless station, the method comprising processing a reception of a grant frame from a second wireless station, the grant frame including a duration field and a dynamic allocation information field, the dynamic allocation information field including an allocation duration subfield set to a predefined value, the duration field being set to a result of subtracting from a time remaining in a Service Period (SP) a transmit time of the grant frame and a Short Inter Frame Space time; and performing the role of a source station of the SP for a remainder of the SP.

Example 95 includes the subject matter of Example 94, and optionally, wherein the predefined value is 32768.

Example 96 includes the subject matter of Example 94 or 95, and optionally, wherein the first wireless station is a Direct Multi Gigabit (DMG) station (STA).

Example 97 includes an apparatus of wireless communication, the apparatus comprising means for generating, at a first wireless station, a grant frame including a duration field and a dynamic allocation information field, the dynamic allocation information field including an allocation duration subfield, the allocation duration subfield being set to a value within a predefined range of values, when the grant frame is to grant to a second wireless station a period after a Transmit Opportunity (TxOP), the allocation duration subfield being set to a predefined value which is not within the predefined range of values, when the grant frame is to grant to the second wireless station a period within the TxOP; and means for transmitting the grant frame during the TxOP.

Example 98 includes the subject matter of Example 97, and optionally, wherein the first wireless station is to operate as a holder of the TxOP, the grant frame including the allocation duration subfield set to the predefined value to indicate that a remainder of the TxOP is to be relinquished from the TxOP holder to a TxOP responder.

Example 99 includes the subject matter of Example 98, and optionally, comprising means for setting a value of the duration field to a result of subtracting from a time remaining in the TxOP a transmit time of the grant frame and a Short Inter Frame Space (SIFS) time.

Example 100 includes the subject matter of Example 97, and optionally, comprising means for setting the allocation duration subfield to the value within the predefined range of values to indicate the first wireless station is to attempt to initiate access to communicate with the second wireless station at a time which is based on a sum of the value of the allocation duration subfield and a value of the duration field.

Example 101 includes the subject matter of any one of Examples 97-100, and optionally, comprising means for transmitting the grant frame in a Contention Based Access period (CBAP).

Example 102 includes the subject matter of any one of Examples 97-101, and optionally, wherein the predefined value is 32768.

Example 103 includes the subject matter of any one of Examples 97-102, and optionally, wherein the range of values includes the range of 0 to 32767.

Example 104 includes the subject matter of any one of Examples 97-103, and optionally, wherein the first wireless station is a Direct Multi Gigabit (DMG) station (STA).

Example 105 includes an apparatus of wireless communication, the apparatus comprising means for processing, at a first wireless station, a reception of a grant frame from a second wireless station, the grant frame grant frame including a duration field and a dynamic allocation information field, the dynamic allocation information field including an allocation duration subfield, the allocation duration subfield being set to a value within a predefined range of values, when the grant frame is to grant a period after a Transmit Opportunity (TxOP), the allocation duration subfield being set to a predefined value which is not within the predefined range of values, when the grant frame is to grant a period within the TxOP; and means for, based on the allocation duration subfield, processing a communication in the period after the TxOP or in the period within the TxOP.

Example 106 includes the subject matter of Example 105, and optionally, wherein the first wireless station to operate as a responder of the TxOP, the grant frame including the allocation duration subfield set to the predefined value to indicate that a remainder of the TxOP is to be relinquished from a TxOP holder to the TxOP responder.

Example 107 includes the subject matter of Example 106, and optionally, wherein a value of the duration field is a result of subtracting from a time remaining in the TxOP a transmit time of the grant frame and a Short Inter Frame Space (SIFS) time.

Example 108 includes the subject matter of Example 105, and optionally, wherein allocation duration subfield is set to the value within the predefined range of values to indicate the second wireless station is to attempt to initiate access to communicate with the first wireless station at a time which is based on a sum of the value of the allocation duration subfield and a value of the duration field.

Example 109 includes the subject matter of any one of Examples 105-108, and optionally, comprising means for processing reception of the grant frame in a Contention Based Access period (CBAP).

Example 110 includes the subject matter of any one of Examples 105-109, and optionally, wherein the predefined value is 32768.

Example 111 includes the subject matter of any one of Examples 105-110, and optionally, wherein the range of values includes the range of 0 to 32767.

Example 112 includes the subject matter of any one of Examples 105-111, and optionally, wherein the first wireless station is a Direct Multi Gigabit (DMG) station (STA).

Example 113 includes an apparatus of wireless communication, the apparatus comprising means for generating, at a first wireless station, a grant frame including a duration field and a dynamic allocation information field, the dynamic allocation information field including an allocation duration subfield set to a predefined value, the duration field being set to a result of subtracting from a time remaining in a Service Period (SP) a transmit time of the grant frame and a Short Inter Frame Space time; and means for transmitting the grant frame during the SP.

Example 114 includes the subject matter of Example 113, and optionally, comprising means for operating the first wireless station as source station of the SP, and relinquishing a remainder of the SP from the source station to a destination station of the SP.

Example 115 includes the subject matter of Example 113 or 114, and optionally, wherein the predefined value is 32768.

Example 116 includes the subject matter of any one of Examples 113-115, and optionally, wherein the first wireless station is a Direct Multi Gigabit (DMG) station (STA).

Example 117 includes an apparatus of wireless communication, the apparatus comprising means for processing, at a first wireless station. a reception of a grant frame from a second wireless station, the grant frame including a duration field and a dynamic allocation information field, the dynamic allocation information field including an allocation duration subfield set to a predefined value, the duration field being set to a result of subtracting from a time remaining in a Service Period (SP) a transmit time of the grant frame and a Short Inter Frame Space time; and means for performing the role of a source station of the SP for a remainder of the SP.

Example 118 includes the subject matter of Example 117, and optionally, wherein the predefined value is 32768.

Example 119 includes the subject matter of Example 117 or 118, and optionally, wherein the first wireless station is a Direct Multi Gigabit (DMG) station (STA).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a first wireless communication station (STA) to:
    set a value of an allocation duration field to indicate whether a grant frame is for a first purpose or for a second purpose, the first purpose comprises an allocation beyond a current time period allocation for the first STA, the second purpose comprises an allocation within the current time period allocation for the first STA, the first purpose to be indicated by the value of the allocation duration field set in a range from 0 to 32767, the second purpose to be indicated by the value of the allocation duration field set to 32768; and
    transmit the grant frame to a second STA during the current time period allocation for the first STA, the grant frame comprising a duration field and a dynamic allocation information (Info) field, the dynamic allocation Info field comprising the allocation duration field.

2. The apparatus of claim 1, wherein the first purpose comprises an allocation beyond a current Transmit opportunity (TXOP), and the second purpose comprises an allocation within the current TXOP.

3. The apparatus of claim 1 configured to cause the first STA to, when setting the value of the allocation duration field in the range from 0 to 32767, set a value of the duration field such that a sum of the value of the allocation duration field and the value of the duration field is to indicate when the first STA is to attempt to initiate access for communication with the second STA.

4. The apparatus of claim 3, wherein the sum of the value of the allocation duration field and the value of the duration field is to indicate a time offset, from a transmit end (TXEND) indication primitive of the grant frame, of when the first STA is to attempt to initiate the access for communication with the second STA.

5. The apparatus of claim 1 configured to cause the first STA to set the value of the allocation duration field to 32768, and to transmit the grant frame during a Transmit Opportunity (TXOP) to relinquish a remainder of the TXOP to the second STA.

6. The apparatus of claim 5 configured to cause the first STA to set an Allocation type field in the dynamic allocation Info field to indicate a Contention Based Access Period (CBAP).

7. The apparatus of claim 5 configured to cause the first STA to set a value of the duration field based on a time remaining in the TXOP.

8. The apparatus of claim 5 configured to cause the first STA to set a value of the duration field to a result of subtracting from a time remaining in the TXOP a transmit time of the grant frame and a Short Inter Frame Space (SIFS) time.

9. The apparatus of claim 5 configured to cause the first STA to switch from a role of a TXOP holder to a role of a TXOP responder for the remainder of the TXOP.

10. The apparatus of claim 1 configured to cause the first STA to set the value of the allocation duration field to 32768, and to transmit the grant frame during a Service Period (SP) to relinquish a remainder of the SP to the second STA.

11. The apparatus of claim 10 configured to cause the first STA to set an Allocation type field in the dynamic allocation Info field to indicate the SP.

12. The apparatus of claim 10 configured to cause the first STA to set a value of the duration field based on a time remaining in the SP.

13. The apparatus of claim 10 configured to cause the first STA to set a value of the duration field to a result of subtracting from a time remaining in the SP a transmit time of the grant frame and a Short Inter Frame Space (SIFS) time.

14. The apparatus of claim 10 configured to cause the first STA to switch from a role of a source STA to a role of a destination STA for the remainder of the SP.

15. The apparatus of claim 1, wherein the grant frame comprises a Receive Address (RA) field to indicate an address of the second STA.

16. The apparatus of claim 1 comprising a Medium Access Control (MAC), and a Physical Layer (PHY).

17. The apparatus of claim 1 comprising a radio.

18. The apparatus of claim 1 comprising one or more antennas.

19. A product comprising one or more tangible computer-readable non-transitory storage media comprising computer-executable instructions operable to, when executed by at least one processor, enable the at least one processor to cause a first wireless communication station (STA) to:
- set a value of an allocation duration field to indicate whether a grant frame is for a first purpose or for a second purpose, the first purpose comprises an allocation beyond a current time period allocation for the first STA, the second purpose comprises an allocation within the current time period allocation for the first STA, the first purpose to be indicated by the value of the allocation duration field set in a range from 0 to 32767, the second purpose to be indicated by the value of the allocation duration field set to 32768; and
- transmit the grant frame to a second STA during the current time period allocation, for the first STA, the grant frame comprising a duration field and a dynamic allocation information (Info) field, the dynamic allocation Info field comprising the allocation duration field.

20. The product of claim 19, wherein the first purpose comprises an allocation beyond a current Transmit opportunity (TXOP), and the second purpose comprises an allocation within the current TXOP.

21. The product of claim 19, wherein the instructions, when executed, cause the first STA to, when setting the value of the allocation duration field in the range from 0 to 32767, set a value of the duration field such that a sum of the value of the allocation duration field and the value of the duration field is to indicate when the first STA is to attempt to initiate access for communication with the second STA.

22. The product of claim 19, wherein the instructions, when executed, cause the first STA to set the value of the allocation duration field to 32768, and to transmit the grant frame during a Transmit Opportunity (TXOP) to relinquish a remainder of the TXOP to the second STA.

23. The product of claim 22, wherein the instructions, when executed, cause the first STA to set a value of the duration field based on a time remaining in the TXOP.

24. The product of claim 22, wherein the instructions, when executed, cause the first STA to switch from a role of a TXOP holder to a role of a TXOP responder for the remainder of the TXOP.

25. The product of claim 19, wherein the instructions, when executed, cause the first STA to set the value of the allocation duration field to 32768, and to transmit the grant frame during a Service Period (SP) to relinquish a remainder of the SP to the second STA.

26. The product of claim 25, wherein the instructions, when executed, cause the first STA to set a value of the duration field based on a time remaining in the SP.

27. The product of claim 25, wherein the instructions, when executed, cause the first STA to switch from a role of a source STA to a role of a destination STA for the remainder of the SP.

28. An apparatus comprising:
- means for setting at a first wireless communication station (STA) a value of an allocation duration field to indicate whether a grant frame is for a first purpose or for a second purpose, the first purpose comprises an allocation beyond a current time period allocation for the first STA, the second purpose comprises an allocation within the current time period allocation for the first STA, the first purpose to be indicated by the value of the allocation duration field set in a range from 0 to 32767, the second purpose to be indicated by the value of the allocation duration field set to 32768; and
- means for causing the first STA to transmit the grant frame to a second STA during the current time period allocation for the first STA, the grant frame comprising a duration field and a dynamic allocation information (Info) field, the dynamic allocation Info field comprising the allocation duration field.

29. The apparatus of claim 28, wherein the first purpose comprises an allocation beyond a current Transmit opportunity (TXOP), and the second purpose comprises an allocation within the current TXOP.

30. The apparatus of claim 28 comprising means for causing the first STA to set the value of the allocation duration field to 32768, and to transmit the grant frame during a Transmit Opportunity (TXOP) to relinquish a remainder of the TXOP to the second STA.

* * * * *